(12) United States Patent
Crevin et al.

(10) Patent No.: US 8,647,202 B2
(45) Date of Patent: Feb. 11, 2014

(54) COMPANION OBJECT CUSTOMIZATION

(75) Inventors: Sari Crevin, Bellevue, WA (US); John Ikeda, Seattle, WA (US); David Nelson, Duvall, WA (US); Brian Allen Bilodeau, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 264 days.

(21) Appl. No.: 12/970,674

(22) Filed: Dec. 16, 2010

(65) Prior Publication Data

US 2012/0157206 A1 Jun. 21, 2012

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ...... 463/36; 463/1; 463/42; 463/43; 446/141; 446/142; 446/175; 446/268; 700/94; 709/201

(58) Field of Classification Search
USPC ............ 463/1, 36, 42, 43; 446/141, 142, 175, 446/268; 700/94; 705/1; 709/201
See application file for complete search history.

(56) References Cited

U.S. PATENT DOCUMENTS

| | | | |
|---|---|---|---|
| 5,289,273 A * | 2/1994 | Lang | 348/121 |
| 2002/0022507 A1 * | 2/2002 | Dan et al. | 463/1 |
| 2002/0049606 A1 * | 4/2002 | Dan et al. | 705/1 |
| 2002/0107591 A1 * | 8/2002 | Gabai et al. | 700/94 |
| 2007/0097832 A1 | 5/2007 | Koivisto et al. | |
| 2007/0293119 A1 * | 12/2007 | Sosnovskiy | 446/175 |
| 2009/0047865 A1 | 2/2009 | Nakano | |
| 2009/0291764 A1 | 11/2009 | Kirkman et al. | |
| 2010/0203933 A1 | 8/2010 | Eyzaguirre et al. | |

OTHER PUBLICATIONS

Lasorne, Frantz., "Augmented Reality Toys.v1 (Work in progress)", Retrieved at << http://vimeo.com/3515273 >>, Retrieved Date: Aug. 25, 2010, pp. 6.

* cited by examiner

*Primary Examiner* — Adetokunbo O Torimiro
(74) *Attorney, Agent, or Firm* — Judy Yee; Micky Minhas

(57) ABSTRACT

A game-interactive customizable companion object includes a body, a communication subsystem housed within the body, and a behavior subsystem configured to control movement of the body. The behavior subsystem may include an initiation module configured to set initial behavioral characteristics of the companion object in accordance with the companion object profile, and an update module configured to change behavioral characteristics of the companion object responsive to control commands received from the entertainment system via the communication subsystem.

14 Claims, 3 Drawing Sheets

COMPANION OBJECT CUSTOMIZATION

BACKGROUND

Pet simulation computer games have been developed that allow a user to interact with a virtual pet animal. For example, such games can allow a user to select a virtual pet of their choice, and then play, train, groom, and raise their pet in the virtual space. However, the user's interactions with their virtual pet are limited since the interactions end when the gaming session ends.

SUMMARY

A game-interactive customizable companion object is disclosed. One example embodiment includes a body, a communication subsystem housed within the body, and a behavior subsystem configured to control movement of the body. The behavior subsystem may include an initiation module configured to set initial behavioral characteristics of the companion object in accordance with the companion object profile, and an update module configured to change behavioral characteristics of the companion object responsive to control commands received from the entertainment system via the communication subsystem.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A customizable companion object, such as a robotic toy pet, that can interact with an entertainment system, such as a gaming console, is disclosed. The companion object may be customized with physical features and behavioral characteristics selected by a user. As described in more detail below, by enabling communication between the customized companion object and the entertainment system, real world interactions of the user with the companion object can be used to update the behavioral characteristics of the companion object, as well as the behavioral characteristics of an avatar corresponding to the companion object in a virtual world on the entertainment system. Similarly, virtual world interactions of the companion object avatar with an avatar of the user can be used to update the behavioral characteristics of the companion object. In this way, a user's interactions with a companion object in virtual space are continued into real space and vice versa.

Figure 1:
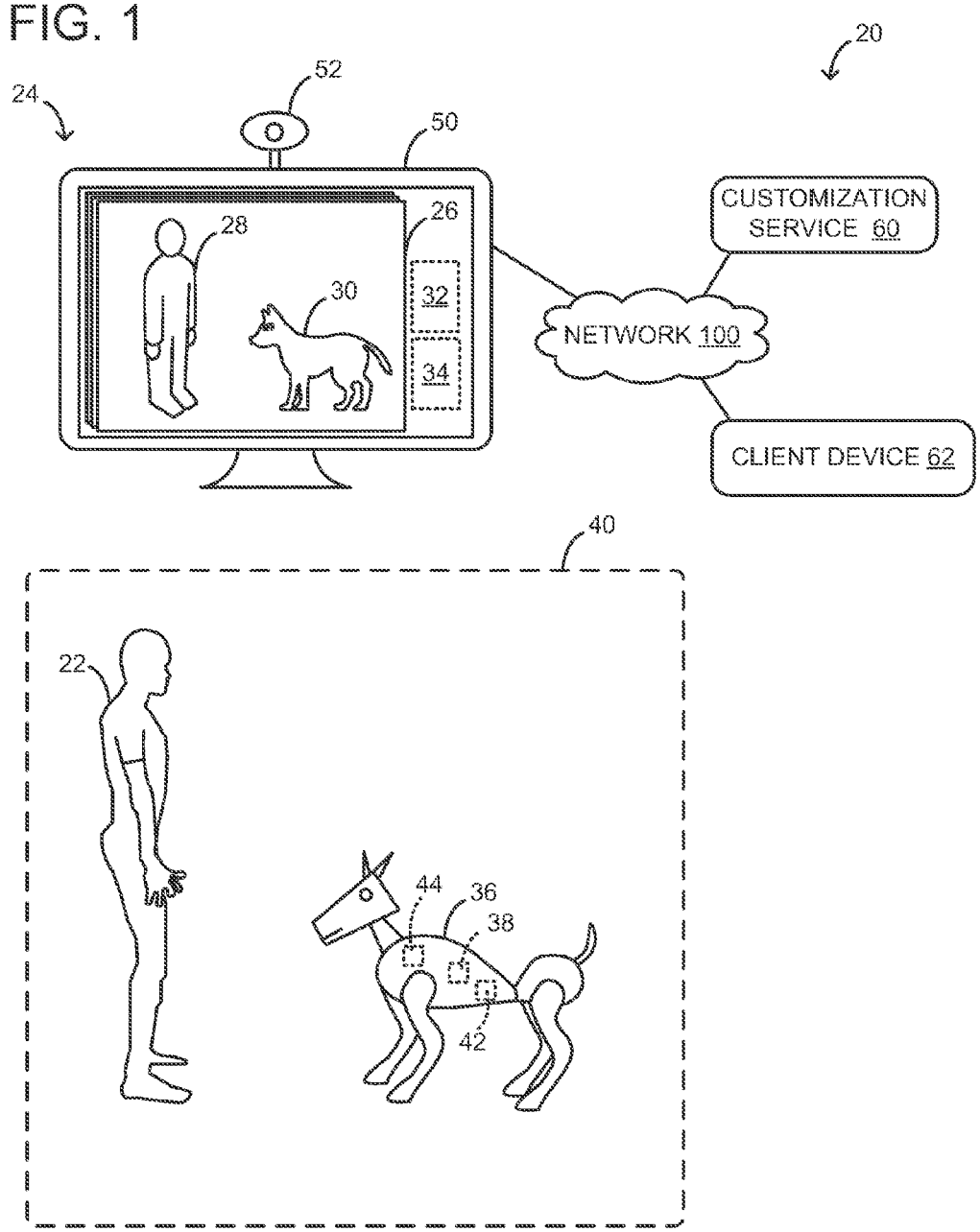
FIG. 1 shows an example environment in accordance with an embodiment of the present disclosure.

Users may play video games on gaming systems. As a non-limiting example, FIG. 1 shows an example environment 20 in which a user (e.g., person 22) can play video games on an entertainment system (e.g., gaming system 24). The gaming system 24 may include a display 50 for displaying a video game to the person 22, as well as an object tracking camera 52 for modeling and tracking the video game player(s). One or more virtual worlds 26 may be created on the gaming system 24 to reflect gaming environments. As a non-limiting example, the person 22 may be playing a pet simulation game. Accordingly, a virtual world 26 may be created wherein a character associated with person 22, such as a player avatar 28, interacts with their virtual pet animal, herein pet avatar 30.

Person 22 may customize pet avatar 30, for example, by selecting physical and behavioral characteristics of pet avatar 30 on gaming system 24 or another suitable device. The customization may be performed in accordance with general preferences of person 22, as indicated in a user profile 32 of person 22 and/or in accordance with specific preferences of person 22, as indicated in a pet profile 34 created by person 22 for the pet avatar 30. Pet profile 34 and user profile 32 may be stored on gaming system 24 (as depicted) or at a remote location that is accessible through network 100.

General preferences indicated in the user profile 32 may include, for example, an indication that person 22 prefers pet dogs rather than pet cats. Specific preferences indicated in pet profile 34 may include, for example, preferences for physical characteristics (e.g., breed type, pet size, fur type, fur color, eye color, tail size, etc.) as well as preferences for behavioral characteristics (e.g., quiet, shy, loud, rambunctious, etc.). A customization service 60 accessible through network 100, such as an online pet customization service, may provide various options to person 22, based on the indicated preferences, to assist person 22 in selecting a virtual pet animal of their choice. Person 22 may access customization service 60 using a client device 62 (e.g., laptop or desktop computer, a network-accessible telephone, etc.), via gaming system 24, or any device capable of communicating with network 100.

The gaming effect of the pet simulation game may be further enhanced for person 22 through the use of a game-interactive companion object, herein toy 36. In one example, person 22 may order toy 36 using customization service 60. Therein, person 22 may customize various attributes (e.g., physical and behavioral characteristics) of toy 36 so that toy 36 is manufactured in accordance with the user's selections. Alternatively, toy 36 may be manufactured and shipped with default attributes and person 22 may update the default attributes. For example, person 22 may purchase attachments (e.g., a different tail) that can be used to update the physical characteristics of toy 36.

In a non-limiting example, customization service 60 may enable person 22 to customize toy 36 in accordance with the pet profile 34 of pet avatar 30, as well as other preferences indicated in user profile 32. For example, physical features of toy 36 (tail length, fur color and length, eye color, etc.) may be customized to match the physical features of pet avatar 30, so that toy 36 looks like the person's virtual animal in the virtual world 26. Thus, person 22 may have created pet avatar 30 on the gaming system 24 before customizing toy 36. Alternatively, person 22 may select toy 36 at the same time as selecting a pet avatar on the gaming system 24. In still another example, person 22 may first select toy 36 and then create pet avatar 30 to match the attributes of toy 36. While the above example suggests matching the features of pet avatar 30 with those of toy 36, this is not required. In further examples, where person 22 may desire to have different sets of pets in the real world 40 and the virtual world 26, the physical features of toy 36 may be distinct from those of pet avatar 30.

In addition to physical characteristics, toy 36 may also have behavioral characteristics that define the personality of toy 36. The behavioral characteristics may be customized in accordance with the selections made by person 22 on customization service 60, or in accordance with pet avatar 30 so that the behavior of toy 36 in real world 40 matches the person's virtual animal in the virtual world. Alternatively, toy 36 may be manufactured and shipped with default behavioral characteristics that can be updated by person 22 interacting with toy 36.

Figure 3:
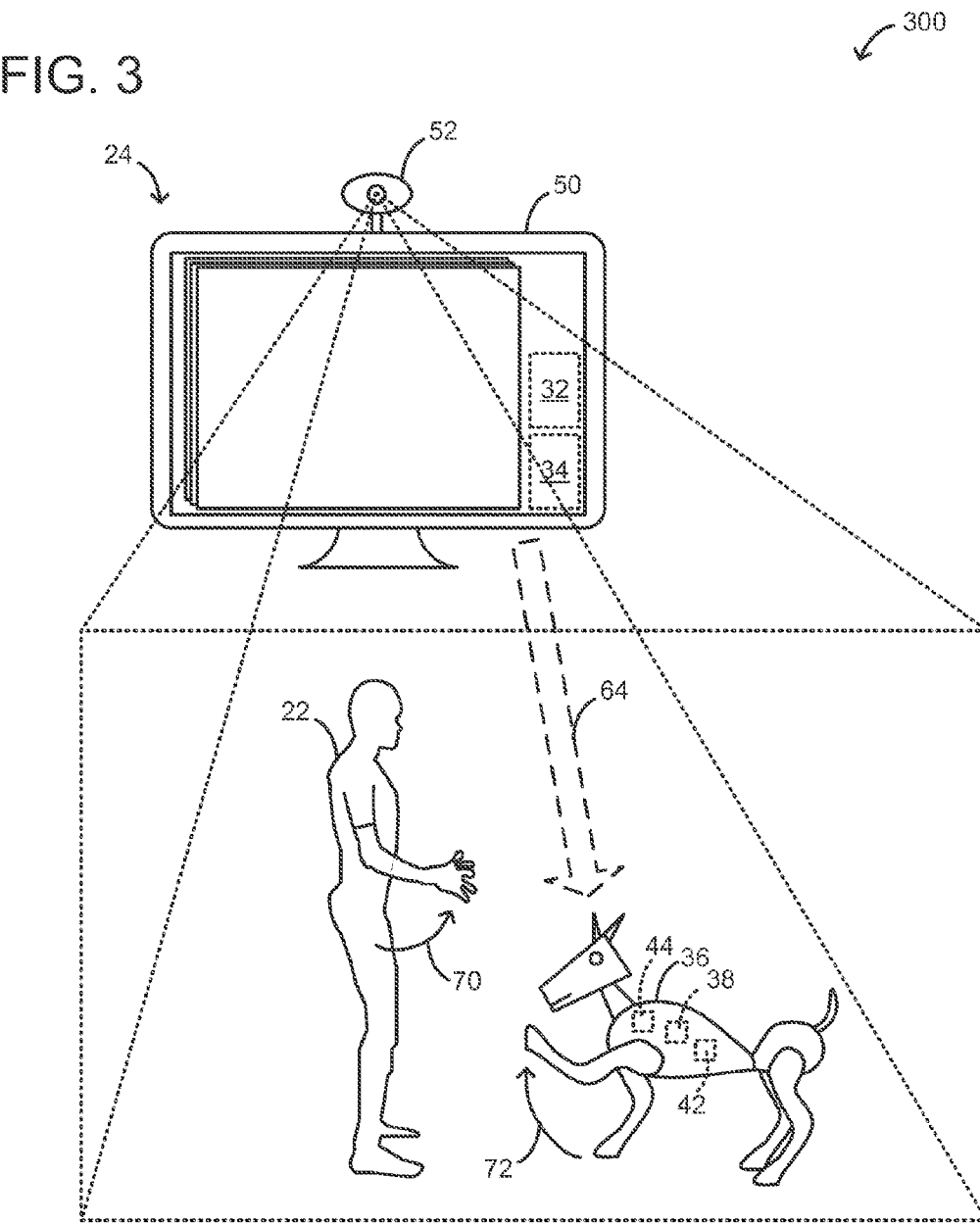
FIG. 3 illustrates an example scene of a change in a behavioral characteristic of a companion object in response to a gesture recognized by the entertainment system.

As elaborated in FIG. 3, the initial behavioral characteristics of customized toy 36 control the general behavior of the companion object. The behavior may include activity level, friendliness, aggressiveness, etc. Aspects of the behavior may include, for example, a set of body movements (e.g., tail wag, head nod, etc) and/or a set of sounds (e.g., bark, whimper, etc.) performed in response to a command gesture (e.g., clap, finger snap, whistle, a specific word command or noise command, etc.) executed by the person 22 in the real world 40, or in response to some other real or virtual world stimulus. This set of movements and/or noises may correspond to similar (e.g., identical) movements and/or noises performed in the virtual world by pet avatar 30 in response to the same command gesture executed by player avatar 28 and/or other stimuli. Thus, in one example, toy 36 may know basic "tricks" or commands that player avatar 28 may have already taught pet avatar 30 in the virtual world 26 on the gaming system 24.

In some embodiments, toy 36 may be a learning toy whose behavior may be updated over time. As person 22 interacts (or "plays") with toy 36, the behavioral characteristics may be updated (or "taught"). In particular, behavioral characteristics of toy 36 may be updated based on real (or direct) interactions of person 22 with the toy 36 in the real world 40 as well as virtual (or indirect) interactions of person with the toy via the player avatar 28 interacting with the pet avatar 30 in the virtual world 26. Gaming system 24 may monitor the direct and indirect interactions of person 22 with toy 36 and update the behavioral characteristics of toy 36 in accordance with the monitored interactions. As one example, when person 22 and toy 36 are within a predefined viewing range of gaming system 24, object; tracking camera 52 may capture images of a scene wherein person 22 is playing with toy 36. Based on the captured images, gaining system 24 may recognize a command gesture executed by person 22 and send a control command to toy 36, for example, wirelessly through a wireless communication device of the gaming system in communication with the communication device of toy 36, to make the toy respond to the recognized gesture. For example, as elaborated in FIG. 3, the control command sent from the gaming system 24 may cause the toy 36 to move a body part and/or generate a sound. In addition to updating the behavioral characteristics of toy 36, the corresponding behavioral characteristics of pet avatar 30 may also be updated.

Direct interactions of person 22 with toy 36 may also be detected by one or more sensors 42 in toy 36, and indicated to gaming system 24. In other words, a user can play with the toy when the toy is not communicating with the gaming system. In one example, such direct interactions may be sensed when toy 36 is not communicating with gaming system 24, such as when toy 36 is outside the viewing range of the gaming system, or when the gaming system is in an idle mode. The direct interactions sensed, and the behavioral characteristics updated during such conditions may be stored in a storage device 44 of toy 36. Then, when toy 36 resumes communication with gaming system 24, such as when toy 36 returns within the viewing range, and/or when the gaming system resumes an active (e.g., gaming) mode, the detected interactions and related updates stored in the storage device 44 may be relayed back to gaming system 24 from toy 36 via the communication device. Toy 36 may include a communication device 38 that communicatively couples toy 36 to gaming system 24 and allows toy 36 to receive updates and commands from the gaming system, as well as to send updates and notifications to the gaming system.

Direct interactions may include, for example, person 22 petting the toy, grooming the toy, feeding the toy, taking the toy for a walk, etc. As elaborated herein, based on the detected interaction, the toy 36 may move a body part and/or generate a sound. As one example, person 22 may be able to teach the toy 36 new "tricks" or commands. As another example, by petting or grooming the toy 36, the toy may learn to like person 22 more and respond accordingly (e.g., wag a tail, lick person 22, etc.). By relaying the detected interaction and the updated behavioral characteristic to the gaming system, a corresponding behavioral characteristic of pet avatar 30 may also be updated, so that the behavior of toy 36 and the behavior of pet avatar 30 are consistent.

In this way, person 22 may indirectly interact with the virtual pet animal in the virtual world 26 on the gaming system 24 via interactions of the player avatar 28 with the pet avatar 30, while continuing the interaction with the toy 36 in the real world 40, thereby providing continuity to the pet simulation game.

It should be appreciated that FIG. 1 is intended to be illustrative and not limiting in any manner. As such, the systems described herein may be tied to a variety of different toys. The examples shown in FIGS. 1 and 3 are directed towards a toy in the form of a pet dog. However, a variety of different types of companion objects may be used without departing from the scope of this disclosure. While FIGS. 1 and 3 use a toy dog to illustrate concepts of a game interactive customizable toy, it will be appreciated that the depicted scenario is not meant to be limiting in any way. On the contrary, the illustrated toy dog and related interactions are intended to demonstrate a general concept, which may be applied to a variety of different toys and entertainment systems without departing from the scope of this disclosure.

Figure 2:
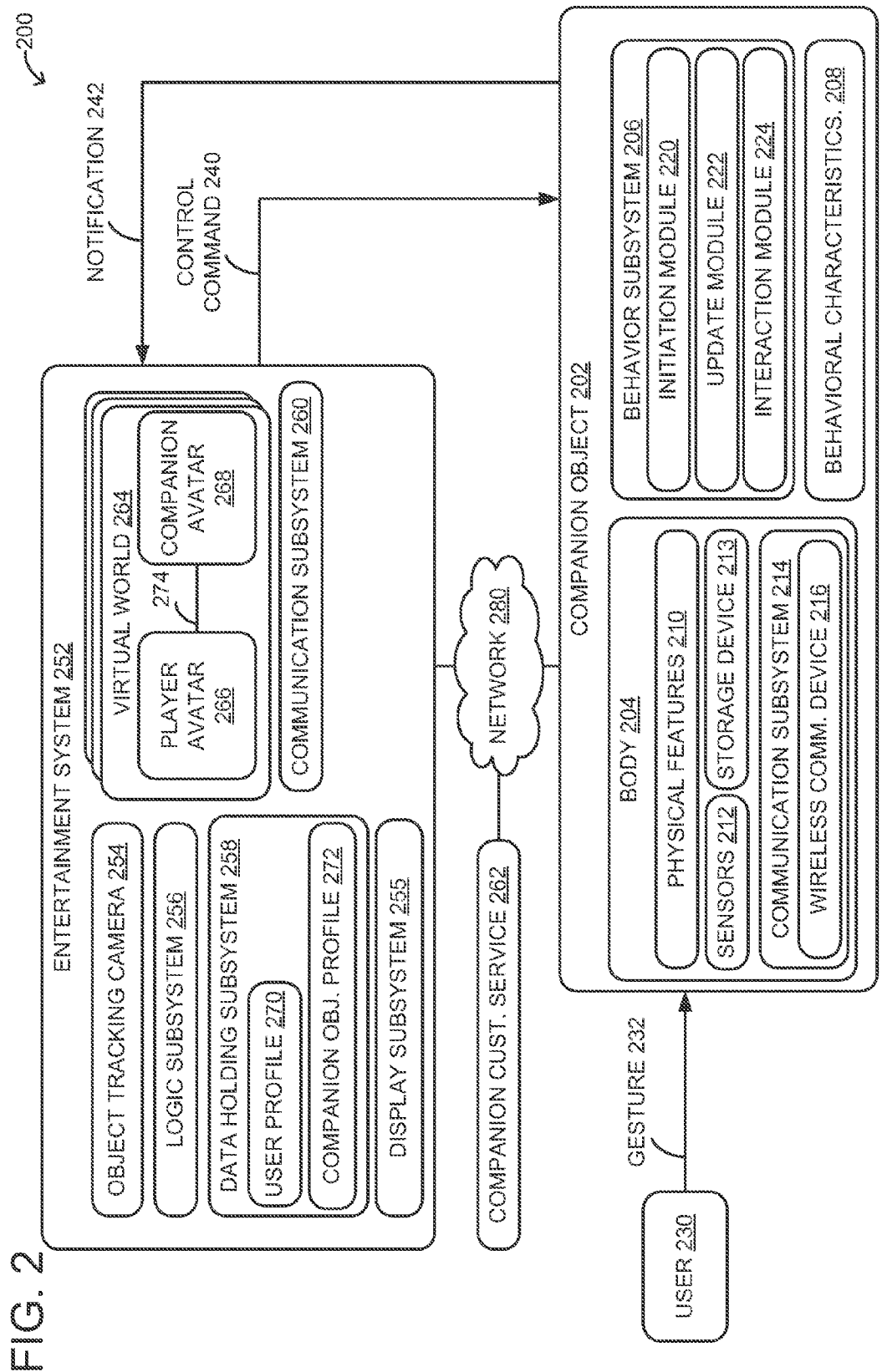
FIG. 2 schematically illustrates a companion object interacting with an entertainment system.

FIG. 2 schematically illustrates an example embodiment 200 of a companion object 202 that may communicate with an example entertainment system 252. Companion object 202 may have a body 204 including one or more physical features 210 customized in accordance with a companion object profile 272 selected via a companion customization service 262. In one example, the body 204 of the companion object 202 is configured as a pet animal, for example, a pet dog. Companion object 202 may further include a communication subsystem 214 housed within the body 204 and configured to communicate with entertainment system 252. For example, communication subsystem 214 may include a wireless communication device 216 to enable the companion object 202 to wirelessly communicate with a communication subsystem 260 of entertainment system 252 via network 280. Companion object 202 may further comprise one or more sensors 212, also housed within the body 204, to detect a direct interaction of user 230 with the companion object 202. Data related to the direct; interactions sensed by sensors 212 may be stored in storage device 213 housed within the body 204 of the companion object 202. In one example, storage device 213 may take the form of computer-readable removable media. The data stored in storage device 213 may be transferred from companion object 202 to entertainment system 252 via communication subsystem 214.

Companion object 202 may include a behavior subsystem 206 configured to control movement of the body 204 as well as to express behavioral characteristics 208 of the companion object. Behavior subsystem 206 may include an initiation module 220 configured to set initial behavioral characteristics

208 of the companion object 202 in accordance with the companion object profile 272. The initial behavioral characteristics 208 may include, for example, an initial set of body movements that are executed in response to a stimulus. The stimulus may include, for example, a gesture 232 executed by user 230. An update module 222 of behavior subsystem 206 may be configured to change the behavioral characteristics 208 of the companion object 202 responsive to control commands 240 received from the entertainment system 252 via the communication subsystem 214. The change in the behavioral characteristics 208 of the companion object may include an updated set of body movements executed in response to the same stimulus, such as the same gesture 232. As such, the updated set of body movements may differ from the initial set of body movements. In another example, the initial behavioral characteristics may include an initial set of sounds that are executed by companion object 202 in response to the stimulus, such as gesture 232. Herein, the change in the behavioral characteristics of the companion object may include an updated set of sounds executed in response to the same stimulus, the updated set of sounds different from the initial set of sounds. As elaborated below, the control commands 240 may be received from the entertainment system 252 in response to the gesture 232 executed by user 230 and recognized by an object tracking camera 254 of the entertainment system.

An interaction module 224 included in behavior subsystem 206 may be configured to detect the direct interaction of the user 230 with the companion object 202 via the one or more sensors 212 and send a notification 242 of the direct interaction to the entertainment system 252 via communication subsystem 214. The companion object 202 may then receive further control commands 240 from the entertainment system in response to the notification 242 sent by the interaction module 224. The update module 222 may also change behavioral characteristics of a companion avatar 268 associated with the companion object on the entertainment system responsive to the direct interaction detected by the interaction module 224.

Now turning to entertainment system 252, it may include an object tracking camera 254 for monitoring and tracking interactions of user 230 with companion object 202. Object tracking camera may be an integrated camera or a peripheral camera. When a peripheral camera, entertainment system 252 may further include a peripheral input configured to receive depth images from the peripheral camera. The peripheral input may have any configuration suitable for communicatively coupling object; tracking camera 254 to entertainment system 252, such as, for example, USB, USB 2.0, and IEEE 1394. Object tracking camera 254 may obtain depth images of one or more targets, such as user 230 and/or companion object 202. Object tracking camera 254 may be configured to capture video with depth information via any suitable technique (e.g., time-of-flight, structured light, stereo image, etc.). As such, object tracking camera may include a depth camera, a video camera, stereo cameras, and/or other suitable capture devices.

For example, in time-of-flight analysis, the object tracking camera 254 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the object tracking camera to a particular location on the target.

In another example, time-of-flight analysis may be used to indirectly determine a physical distance from the capture device to a particular location on the target by analyzing the intensity of the reflected beam of light over time, via a technique such as shuttered light; pulse imaging.

In another example, structured light analysis may be utilized by object tracking camera 254 to capture depth information. In such an analysis, patterned light (i.e., light displayed as a known pattern such as grid pattern or a stripe pattern) may be projected onto the target. Upon striking the surface of the target, the pattern may become deformed, and this deformation of the pattern may be studied to determine a physical distance from the object tracking camera to a particular location on the target.

In another example, the capture device may include two or more physically separated cameras that view a target from different angles to obtain visual stereo data. In such cases, the visual stereo data may be resolved to generate a depth image.

In other embodiments, object tracking camera 254 may utilize other technologies to measure and/or calculate depth values. Additionally, object tracking camera 254 may organize the calculated depth information into "Z layers," i.e., layers perpendicular to a Z axis extending from the depth camera along its line of sight to the viewer.

In one example, where user 230 is a human and companion object 202 is a toy dog, object tracking camera 254 may capture images of a scene involving the human with the toy dog. Entertainment system 252 may be configured to send control commands 240 to companion object 202 based on the received images to change behavioral characteristics thereof.

Entertainment system 252 further includes a logic subsystem 256, a data-holding subsystem 258, and a communication subsystem 260. Entertainment system 252 may optionally include a display subsystem 255 and/or other components not shown in FIG. 2. Entertainment system 252 may also optionally include user input devices such as keyboards, mice, game controllers, microphones, and/or touch screens, for example.

User 230 may interact with entertainment system 252, for example, to play a variety of video games or control a variety of other applications (e.g., media applications, productivity applications, etc.). Accordingly, one or more virtual worlds 264 may be created on the entertainment system. The user 230 may be represented in the one or more virtual worlds by a character associated with the user, herein depicted as player avatar 266. In one example, user 230 may be represented by the same player avatar 266 in each of the one or more virtual worlds 264. Alternatively, user 230 may have distinct player avatars in each virtual world. Player avatar(s) may be created in accordance with a user profile 270 wherein the user's preferences (such as gaming preferences) are indicated. User profile 270 may be stored on a data holding sub-system 258 of entertainment system 252. In at least one virtual world 264, player avatar 266 may interact with a companion avatar 268. For example, where the virtual world includes a pet simulation game, player avatar 266 may interact with a companion avatar configured as the pet avatar of FIG. 1. Companion avatar 268 may be created in accordance with the user's general preferences in user profile 270, as well as the user's specific preferences, as specified in a companion object profile 272. Companion object profile 272 may also be stored on the data holding sub-system 258. In particular, companion avatar 268 may have physical features and behavioral characteristics based on the companion object profile 272.

While the depicted example illustrates user profile 270 and companion object profile 272 on entertainment system 252, this is not meant to be limiting. Additionally, or optionally, one or more different data files of user profile 270 and companion object profile 272 may be stored at one or more locations (e.g., local profile files, network accessible remote profile files, etc.), accessible through network 280.

A companion customization service 262, accessible via network 280, may enable user 230 to customize companion object 202 based on selections made by user 230. As a non-limiting example, the selections may be made in accordance with and/or while creating or modifying user profile 270 and/or companion object profile 272. For example, one or more physical features of companion object 202 may be customized in accordance with companion object profile 272 such that companion object 202 has physical features similar to those of companion avatar 268. Alternatively, companion object 202 may be customized to have physical features distinct from those of companion avatar 268.

Initial behavioral characteristics of companion object 202 may also be customized. As a non-limiting example, the initial behavioral characteristics may be customized in accordance with companion object profile 272. The initial behavioral characteristics may include, for example, a first set of movements and/or sounds executed in response to a gesture. For example, in virtual world 264, companion avatar 268 may execute a body movement and/or sound in response to a virtual gesture 274 executed by player avatar 266. Upon customization, in the real world, companion object 202 may execute the same body movement and/or sound in response to the same gesture 232 executed by user 230. Entertainment system 252 may be configured to recognize the gesture of the user 230 based on one or more images captured by and received from object tracking camera 254, and accordingly wirelessly send a control command 240 to the companion object 202 responsive to the recognized gesture 232. In one example, data holding subsystem 258 may hold instructions for receiving the images, recognizing the gesture, and sending the control command, the instructions executable by a logic subsystem 256 of the entertainment system operatively connected to the object tracking camera 254, for example, via a peripheral input. The entertainment system 252 may send the control command 240 wirelessly via a communication subsystem 260 of the entertainment system communicating with a wireless communication device 216 of the companion object over network 280.

Control command 240 may change a behavioral characteristic of companion object 202. As one example, the control command 240 may be configured to move the body 204 of companion object. As another example, the control command 240 may be configured to generate a sound at the companion object. As another example, where the initial behavioral characteristics include a first set of movement and/or sounds generated in response to gesture 232, the change in behavioral characteristics commanded by the control command may cause the companion object to execute a second, different set of movements and/or sounds in response to gesture 232.

Control command 240 may also be sent to companion object 202 in response to virtual interactions 274 between player avatar 266 associated with the user 230, such as a human, and the companion avatar 268 associated with the companion object 202. As elaborated below, the control command 240 may be configured to change a behavioral characteristic 208 of the companion object 202.

Conversely, direct interactions between user 230 and companion object 202 may also be monitored to control virtual interactions between player avatar 266 and companion object avatar 268. For example, object tracking camera 254 may track movements of user 230 and companion object 202 in the real world, and correspondingly adjust movements of player avatar 266 and companion object avatar 268 in virtual world 264.

Data holding subsystem 250 may hold further instructions to wirelessly receive an indication, or notification 242, from the companion object 202 regarding a direct interaction of the user 230 with the companion object 202, as detected by the one or more sensors 212 of the companion object. Accordingly, a further control command 240 may be sent wirelessly to the companion object 202 responsive to the received notification. The companion object profile 272 may also be updated responsive to the direct interaction, or recognized gesture 232. In addition, the companion object profile 272 may be updated in accordance with virtual interactions 274.

Logic subsystem 256 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 256 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 258 may include one or more physical, non-transitory, devices configured to hold data and/or instructions executable by the logic subsystem to implement the herein described methods and processes. When such methods and processes are implemented, the state of data-holding subsystem 258 may be transformed (e.g., to hold different data).

Data-holding subsystem 258 may include removable media and/or built-in devices. Data-holding subsystem 258 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 258 may include devices with one or more of the following characteristics: volatile, nonvolatile, dynamic, static, read/write, read-only, random access, sequential access, location addressable, file addressable, and content addressable. In some embodiments, logic subsystem 256 and data-holding subsystem 258 may be integrated into one or more common devices, such as an application specific integrated circuit or a system on a chip.

The terms "module," "program," and "engine" may be used to describe an aspect of entertainment system 252 that; is implemented to perform one or more particular functions. In some cases, such a module, program, or engine may be instantiated via logic subsystem 256 executing instructions held by data-holding subsystem 258. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, display subsystem 255 may be used to present a visual representation of data held by data-holding subsystem 258. As the herein described methods and processes change the data held by the data-holding subsystem, and thus transform the state of the data-holding subsystem, the state of display subsystem 255 may likewise be transformed to visually represent changes in the underlying data. Display subsystem 255 may include one or more display devices utilizing virtually any type of technology. Such display devices may be combined with logic subsystem 256 and/or data-holding subsystem 258 in a shared enclosure, or such display devices may be peripheral display devices.

Communication subsystem 260 may be configured to communicatively couple entertainment system 252 with one or more other computing devices in addition to companion object 202. Communication subsystem 260 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some embodiments, the communication subsystem may allow entertainment system 252 to send and/or receive messages to and/or from other devices via a network such as the Internet.

In this way, virtual interactions 274 of player avatar 266 with companion avatar 268 in virtual world 264 may be communicated with companion object 202, while real interactions, such as gesture 232, of user 230 with companion object 202 are relayed to entertainment system 252. As such, this allows the behavior of companion object 202 to be matched with the behavior of companion avatar 268 as a game on the entertainment system progresses. Thus, even when the player avatar 266 is not interacting with companion avatar 268, user 230 may continue to enjoy a game on the entertainment system through direct interactions of the user 230 with the companion object 202. As such, this may enhance the gaming experience of the user.

FIG. 3 shows an example scenario wherein an entertainment system monitors interactions between a user and a companion object; in a real world and updates the behavioral characteristic of the companion object upon recognizing the user's gesture. In particular, FIG. 3 shows an example scene 300 of person 22 playing with toy 36.

Gaming system 24 monitors and tracks interactions of person 22 playing with toy 36 when person 22 and toy 36 are within a viewing range of object tracking camera 52. In the depicted example, while person 22 is playing with toy 36, he or she may execute gesture 70, wherein person 22 extends an arm out to shake hands. Object tracking camera 52 may capture images of person 22 playing with toy 36. Gaming system 24 receives the captured images, and based on the received images, recognizes gesture 70. Upon recognizing gesture 70, gaming system 24 wirelessly sends a control command 64 to toy 36 which is received via a communication device 38 of toy 36. Control command 64 may be configured to control toy 36, for example, by causing toy 36 to move a body part and/or make a sound. In the depicted example, in response to the control command 64 received from the gaming system, toy 36 is configured to execute a gesture 72, wherein toy 36 extends a paw to shake hands with person 22.

In one example, the gesture recognized by the gaming system, and/or the response elicited by the control command sent by the gaming system, may have been learned during prior gaming sessions. For example, gaming system 24 may have learnt a similar "shake hands" gesture and response during a previous gaming session based on interactions between a player avatar and a pet avatar. Therein, the "shake hands" gesture and response may have been stored as a behavioral characteristic of pet avatar 30 in pet profile 34. As such, gestures and responses from the virtual world of the gaming system 24 can be mirrored in the real world during interactions of person 22 with toy 36. This may allow a pet simulation game played by the person in the virtual world to be continued in the real world.

Behavioral characteristics of toy 36 may be updated even when person 22 interacts with toy 36 outside the viewing range of the gaming system 24, that is, when toy 36 is not communicating with gaming system 24. During such interactions that are outside the viewing range of the gaming system, toy 36 may detect the direct interactions of person 22 with toy 36 and store data pertaining to the detected interactions in storage device 44. The toy 36 may also store data pertaining to the behavioral characteristics updated in response to the detected interactions (such as, newly "learned" tricks) in the storage device. Toy 36 may then update the gaming system about those direct interactions and updated behavioral characteristics when the toy is back within the viewing and communication range of the gaming system. This allows a pet simulation game played by the person in the real world to be continued into the virtual world.

For example, while outside the viewing range, person 22 may execute a gesture (e.g., pet or groom toy 36) that is sensed by the one or more sensors 42 in the body of toy 36. An interaction module of toy 36 may be configured to detect; the direct interaction and control toy 36 in response to the detected gesture. For example, the toy may move wag a tail) in response to the gesture recognized by the interaction module. The out-of-range interaction and the changed behavioral characteristic may then be stored (for example, temporarily stored) in storage device 44. The out-of-range interaction may be relayed to gaming system 24, for example, via a notification sent by the interaction module of toy 36, when toy 36 returns within the communication range of the gaming system. Optionally, changed behavioral characteristic may be stored by gaming system 24 in pet profile 34 and a behavioral characteristic of pet avatar 30 in virtual world 26 may be adjusted during a later gaming session. For example, in a later gaming session, the pet avatar may be configured to execute a similar (wag tail) gesture to indicate affection to the player avatar.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A companion object, comprising:
    a body including one or more physical features customized in accordance with a companion object profile selected via a companion customization service;
    a communication subsystem housed within the body and configured to wirelessly communicate with an entertainment system; and
    a behavior subsystem located within the companion object and configured to control movement of the body, the behavior subsystem including:
        an initiation module configured to set initial behavioral characteristics of the companion object in accordance with the companion object profile; and
        an update module configured to change behavioral characteristics of the companion object responsive to control commands received from the entertainment system via the communication subsystem.

2. The companion object of claim 1, further comprising one or more sensors, wherein the behavior subsystem further includes an interaction module configured to detect a direct interaction of a user with the companion object via the one or more sensors and send a notification of the direct interaction to the entertainment system via the communication subsystem.

3. The companion object of claim 2, wherein the control commands are received from the entertainment system in response to the notification sent by the interaction module.

4. The companion object of claim 2, wherein the update module is further configured to change behavioral characteristics of a companion avatar associated with the companion object on the entertainment system responsive to the direct interaction detected by the interaction module.

5. The companion object of claim 2, where the control commands are derived from indirect interactions of the user with the companion object.

6. The companion object of claim 5, where the indirect interactions of the user with the companion object include gestures performed by the user that are not detected by the one or more sensors included in the companion object.

7. The companion object of claim 6, where the indirect interactions of the user with the companion object are detected by an object tracking camera included in the entertainment system.

8. The companion object of claim 1, wherein the initial behavioral characteristics include an initial set of body movements that are executed in response to a stimulus.

9. The companion object of claim 8, wherein the change in the behavioral characteristics of the companion object as configured by the update module includes an updated set of body movements executed in response to the stimulus, the updated set of body movements differing from the initial set of body movements.

10. The companion object of claim 1, wherein the initial behavioral characteristics include an initial set of sounds that are executed in response to a stimulus, and wherein the change in the behavioral characteristics of the companion object as configured by the update module includes an updated set of sounds executed in response to the stimulus, the updated set of sounds different from the initial set of sounds.

11. The companion object of claim 1, wherein the body of the companion object is configured as a pet animal.

12. The companion object of claim 1, where the control commands are derived from interactions of an avatar corresponding to a user with a companion object avatar corresponding to the companion object.

13. A companion object, comprising:
    a body including one or more physical features selected by a user to correspond to a user-customized companion avatar on an entertainment system;
    a communication subsystem housed within the body and configured to wirelessly communicate with the entertainment system;
    one or more behavioral characteristics corresponding to one or more behavioral characteristics of the user-customized companion avatar; and
    a behavior subsystem located within the companion object and configured to control movement of the body, the behavior subsystem including:
        an update module configured to change the behavioral characteristics of the companion object responsive to control commands received via the communication subsystem and derived from interactions of an avatar corresponding to a user with the user-customized companion avatar.

14. A companion object, comprising:
    a body including one or more physical features selected by a user to correspond to a user-customized companion avatar on an entertainment system;
    a communication subsystem housed within the body and configured to wirelessly communicate with the entertainment system;
    one or more sensors;
    a behavior subsystem located within the companion object and configured to control movement of the body, the behavior subsystem including:
        an interaction module configured to detect a direct interaction of the user with the companion object via the one or more sensors and send a notification of the direct interaction to the entertainment system via the communication subsystem; and
        an update module configured to:
            change behavioral characteristics of the user-customized companion avatar responsive to the direct interaction detected by the interaction module; and
            change behavioral characteristics of the user-customized companion avatar responsive to indirect interactions of the user with the companion object, the indirect interactions detected by an object tracking camera included in the entertainment system, and not detected by the one or more sensors included in the companion object.

* * * * *